(12) United States Patent
Nakamoto

(10) Patent No.: US 11,852,795 B2
(45) Date of Patent: *Dec. 26, 2023

(54) IMAGING DEVICE AND IMAGING METHOD

(71) Applicant: HAMAMATSU PHOTONICS K.K., Hamamatsu (JP)

(72) Inventor: Katsuhiro Nakamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/779,283

(22) PCT Filed: Dec. 7, 2020

(86) PCT No.: PCT/JP2020/045529
§ 371 (c)(1),
(2) Date: May 24, 2022

(87) PCT Pub. No.: WO2021/131648
PCT Pub. Date: Jul. 1, 2021

(65) Prior Publication Data
US 2022/0397752 A1 Dec. 15, 2022

(30) Foreign Application Priority Data
Dec. 25, 2019 (JP) ................................. 2019-234720

(51) Int. Cl.
*G02B 21/06* (2006.01)
*H04N 23/62* (2023.01)
(Continued)

(52) U.S. Cl.
CPC .............. *G02B 21/06* (2013.01); *G02B 21/18* (2013.01); *G02B 26/0833* (2013.01);
(Continued)

(58) Field of Classification Search
CPC .... G02B 21/06; G02B 26/06; G02B 26/0841; G02B 26/0833; G02B 21/367;
(Continued)

(56) References Cited

U.S. PATENT DOCUMENTS

2003/0025955 A1* 2/2003 Curtis ................. G11B 7/0065
2006/0239336 A1 10/2006 Baraniuk et al.
(Continued)

FOREIGN PATENT DOCUMENTS

| CN | 105467806 A | 4/2016 |
| CN | 110231292 A | 9/2019 |

(Continued)

OTHER PUBLICATIONS

International Preliminary Report on Patentability dated Jul. 7, 2022 for PCT/JP2020/045529.
(Continued)

*Primary Examiner* — Abdelaaziz Tissire
(74) *Attorney, Agent, or Firm* — Faegre Drinker Biddle & Reath LLP (57) ABSTRACT

An imaging apparatus includes a light source, a spatial light modulator, a Fourier transform optical system, a photodetector, and a control unit. The control unit sets a first region and a second region on a modulation plane of the spatial light modulator, sequentially sets a plurality of light phase modulation patterns in the first region, sequentially sets a plurality of uniform phase shifts in a region other than the first region when setting each light phase modulation pattern in the first region to acquire a light intensity value, and acquires a phase image of a region of an object corresponding to the first region using a phase shift method.

24 Claims, 8 Drawing Sheets

(51) Int. Cl.
*H04N 23/66* (2023.01)
*H04N 23/67* (2023.01)
*G02B 21/18* (2006.01)
*G02B 26/08* (2006.01)
*G01J 9/02* (2006.01)

(52) U.S. Cl.
CPC ............. *H04N 23/62* (2023.01); *H04N 23/66* (2023.01); *H04N 23/672* (2023.01); *G01J 2009/0265* (2013.01)

(58) Field of Classification Search
CPC ........ G02B 21/18; H04N 23/62; H04N 23/66; H04N 23/56; H04N 23/55; H04N 23/60; H04N 23/672; H04N 23/74; G02F 2203/12; G01J 2009/0265
See application file for complete search history.

(56) References Cited

U.S. PATENT DOCUMENTS

| | | | | |
|---|---|---|---|---|
| 2007/0206201 | A1* | 9/2007 | de Groot | G01B 9/02011 356/512 |
| 2014/0036180 | A1* | 2/2014 | Takiguchi | G02F 1/136 349/33 |
| 2014/0198236 | A1 | 7/2014 | Herman | |
| 2014/0211193 | A1* | 7/2014 | Bloom | G01B 11/2527 356/5.01 |
| 2015/0185523 | A1* | 7/2015 | Matsumoto | G02F 1/13306 359/238 |
| 2015/0285739 | A1* | 10/2015 | Nadakuditi | G01J 9/00 356/342 |
| 2015/0292941 | A1* | 10/2015 | Forbes | H01S 3/0014 356/121 |
| 2016/0276050 | A1 | 9/2016 | Stevens et al. | |
| 2017/0030776 | A1* | 2/2017 | Inoue | G01J 11/00 |
| 2022/0101807 | A1* | 3/2022 | Pires Arrifano | G02B 26/06 |
| 2022/0417407 | A1* | 12/2022 | Nakamoto | H04N 23/72 |

FOREIGN PATENT DOCUMENTS

| | | |
|---|---|---|
| JP | 2016-133668 A | 7/2016 |
| WO | WO-2014/064636 A2 | 5/2014 |

OTHER PUBLICATIONS

Ota, Kazuki et al., "Complex-amplitude single-pixel imaging," Opt. Lett., vol. 43, No. 15, 2018, pp. 3682-3685.

Takhar, Dharmpal et al., "A New Compressive Imaging Camera Architecture using Optical-Domain Compression," Proc. IS&T/SPIE Computational Imaging IV, 2006.

* cited by examiner

|  | S1 | | | | S2 | | | |
|---|---|---|---|---|---|---|---|---|
| | $X_1$ | $X_2$ | $X_3$ | $X_4$ | $X_5$ | $X_6$ | $X_7$ | $X_8$ |
| | $X_9$ | $X_{10}$ | $X_{11}$ | $X_{12}$ | $X_{13}$ | $X_{14}$ | $X_{15}$ | $X_{16}$ |
| | $X_{17}$ | $X_{18}$ | $X_{19}$ | $X_{20}$ | $X_{21}$ | $X_{22}$ | $X_{23}$ | $X_{24}$ |
| | $X_{25}$ | $X_{26}$ | $X_{27}$ | $X_{28}$ | $X_{29}$ | $X_{30}$ | $X_{31}$ | $X_{32}$ |
| | $X_{33}$ | $X_{34}$ | $X_{35}$ | $X_{36}$ | $X_{37}$ | $X_{38}$ | $X_{39}$ | $X_{40}$ |
| | $X_{41}$ | $X_{42}$ | $X_{43}$ | $X_{44}$ | $X_{45}$ | $X_{46}$ | $X_{47}$ | $X_{48}$ |
| | $X_{49}$ | $X_{50}$ | $X_{51}$ | $X_{52}$ | $X_{53}$ | $X_{54}$ | $X_{55}$ | $X_{56}$ |
| | $X_{57}$ | $X_{58}$ | $X_{59}$ | $X_{60}$ | $X_{61}$ | $X_{62}$ | $X_{63}$ | $X_{64}$ |

| \multicolumn{4}{c|}{S1} | \multicolumn{4}{c}{S2} |

| S1 | | | | S2 | | | |
|---|---|---|---|---|---|---|---|
| $g_{k,1}$ | $g_{k,2}$ | $g_{k,3}$ | $g_{k,4}$ | | | | |
| $g_{k,9}$ | $g_{k,10}$ | $g_{k,11}$ | $g_{k,12}$ | | | | |
| $g_{k,17}$ | $g_{k,18}$ | $g_{k,19}$ | $g_{k,20}$ | | | | |
| $g_{k,25}$ | $g_{k,26}$ | $g_{k,27}$ | $g_{k,28}$ | | | | |
| $g_{k,33}$ | $g_{k,34}$ | $g_{k,35}$ | $g_{k,36}$ | | | | |
| $g_{k,41}$ | $g_{k,42}$ | $g_{k,43}$ | $g_{k,44}$ | | | | |
| $g_{k,49}$ | $g_{k,50}$ | $g_{k,51}$ | $g_{k,52}$ | | | | |
| $g_{k,57}$ | $g_{k,58}$ | $g_{k,59}$ | $g_{k,60}$ | | | | |

IMAGING DEVICE AND IMAGING METHOD

TECHNICAL FIELD

The present disclosure relates to an imaging apparatus and an imaging method.

BACKGROUND ART

An imaging apparatus described in Patent Document 1 and Non Patent Document 1 can acquire an image of an object by using a digital micromirror device (DMD) as a spatial light modulator capable of modulating an intensity ratio of output light to input light in each pixel and using a photodetector for detecting an intensity of the input light.

In the imaging apparatus described in these documents, the image of the object is formed on a modulation plane of the DMD, light amplitude modulation is performed in each pixel by the DMD based on a set light amplitude modulation pattern, and an intensity of the modulated light is detected by the photodetector. A plurality of types of light amplitude modulation patterns are sequentially set in the DMD, the photodetector acquires a light intensity value when each light amplitude modulation pattern is set, and a storage unit stores each light amplitude modulation pattern and the corresponding light intensity value. Further, by analyzing the plurality of sets of light amplitude modulation patterns and light intensity values stored in the storage unit, the image of the object can be acquired.

Further, an imaging apparatus described in Non Patent Document 2 can acquire a phase image of an object by using a spatial light modulator capable of modulating a phase of light in each pixel and using a photodetector for detecting an intensity of input light.

In the imaging apparatus described in this document, the image of the object is formed on a modulation plane of the spatial light modulator, light phase modulation is performed in each pixel by the spatial light modulator based on a set light phase modulation pattern, and an intensity of the modulated light is detected by the photodetector. A plurality of types of light phase modulation patterns are sequentially set in the spatial light modulator, the photodetector acquires a light intensity value when each light phase modulation pattern is set, and a storage unit stores each light phase modulation pattern and the corresponding light intensity value. Further, by analyzing the plurality of sets of light phase modulation patterns and light intensity values stored in the storage unit, the phase image of the object can be acquired.

The photodetector used in the above imaging apparatus does not need to be an image sensor in which a plurality of pixels are arranged for detecting an intensity distribution in a beam cross-section of input light, and may be a point sensor including a single pixel. Therefore, when it is required to image an object in a wavelength range in which use of an image sensor is not appropriate, or when it is required to image an object with lower noise or higher performance than the image sensor, imaging by an imaging apparatus using a point sensor is effective.

CITATION LIST

Patent Literature

Patent Document 1: US Patent Application Publication No. 2006/0239336

Non Patent Literature

Non Patent Document 1: Dharmpal Takhar et al., "A New Compressive Imaging Camera Architecture using Optical-Domain Compression", Proc. IS&T/SPIE Computational hnaging IV, 2006

Non Patent Document 2: Kazuki Ota, Yoshio Hayasaki, "Complex-amplitude single-pixel imaging", Opt. Lett., Vol. 43 No. 15, pp. 3682-3685, 2018

SUMMARY OF INVENTION

Technical Problem

The imaging apparatus described in Non Patent Document 2 acquires the phase image of the object by a phase shift method using a partial region of the modulation plane of the spatial light modulator as a reference region. Thus, the number of pixels of the acquired phase image is reduced, and resolution of the phase image is lowered.

An object of the present invention is to provide an imaging apparatus and an imaging method capable of acquiring a phase image of an object with high resolution using a spatial light modulator and a photodetector.

Solution to Problem

An embodiment of the present invention is an imaging apparatus. The imaging apparatus includes (1) a light source for outputting coherent light; (2) a spatial light modulator having a modulation plane on which an image of an object irradiated with output light from the light source is formed, and for performing light phase modulation on input light in each of a plurality of pixel regions on the modulation plane based on a set light phase modulation pattern and outputting modulated light; (3) a Fourier transform optical system for forming a Fourier transform image of output light from the spatial light modulator; (4) a photodetector for selectively receiving zero-order light in the Fourier transform image to detect a light intensity and outputting a light intensity value; and (5) a control unit for controlling setting of the light phase modulation pattern on the modulation plane of the spatial light modulator and acquiring a phase image of the object based on the light phase modulation pattern and the light intensity value, and the control unit is configured to (a) set a first region and a second region on the modulation plane of the spatial light modulator, (b) in a phase image acquisition of the first region, sequentially set a plurality of light phase modulation patterns in the first region, sequentially set a plurality of uniform phase shifts in a region other than the first region when setting each light phase modulation pattern in the first region to acquire the light intensity value, and acquire a phase image of a region of the object corresponding to the first region using a phase shift method, and (c) in a phase image acquisition of the second region, sequentially set a plurality of light phase modulation patterns in the second region, sequentially set a plurality of uniform phase shifts in a region other than the second region when setting each light phase modulation pattern in the second region to acquire the light intensity value, and acquire a phase image of a region of the object corresponding to the second region using the phase shift method.

An embodiment of the present invention is an imaging apparatus. The imaging apparatus includes (1) a light source for outputting coherent light; (2) a spatial light modulator having a modulation plane to which output light from the light source is input, and for performing light phase modulation on input light in each of a plurality of pixel regions on the modulation plane based on a set light phase modulation pattern and outputting modulated light; (3) a Fourier transform optical system for forming a Fourier transform image of an object irradiated with output light from the spatial light modulator; (4) a photodetector for selectively receiving zero-order light in the Fourier transform image to detect a light intensity and outputting a light intensity value; and (5) a control unit for controlling setting of the light phase modulation pattern on the modulation plane of the spatial light modulator and acquiring a phase image of the object based on the light phase modulation pattern and the light intensity value, and the control unit is configured to (a) set a first region and a second region on the modulation plane of the spatial light modulator, (b) in a phase image acquisition of the first region, sequentially set a plurality of light phase modulation patterns in the first region, sequentially set a plurality of uniform phase shifts in a region other than the first region when setting each light phase modulation pattern in the first region to acquire the light intensity value, and acquire a phase image of a region of the object corresponding to the first region using a phase shift method, and (c) in a phase image acquisition of the second region, sequentially set a plurality of light phase modulation patterns in the second region, sequentially set a plurality of uniform phase shifts in a region other than the second region when setting each light phase modulation pattern in the second region to acquire the light intensity value, and acquire a phase image of a region of the object corresponding to the second region using the phase shift method.

An embodiment of the present invention is an imaging method. The imaging method is a method for imaging an object using (1) a light source for outputting coherent light; (2) a spatial light modulator having a modulation plane on which an image of the object irradiated with output light from the light source is formed, and for performing light phase modulation on input light in each of a plurality of pixel regions on the modulation plane based on a set light phase modulation pattern and outputting modulated light; (3) a Fourier transform optical system for forming a Fourier transform image of output light from the spatial light modulator; and (4) a photodetector for selectively receiving zero-order light in the Fourier transform image to detect a light intensity and outputting a light intensity value, and includes (a) a region setting step of setting a first region and a second region on the modulation plane of the spatial light modulator; (b) a first region phase image acquisition step of sequentially setting a plurality of light phase modulation patterns in the first region, sequentially setting a plurality of uniform phase shifts in a region other than the first region when setting each light phase modulation pattern in the first region to acquire the light intensity value, and acquiring a phase image of a region of the object corresponding to the first region using a phase shift method; and (c) a second region phase image acquisition step of sequentially setting a plurality of light phase modulation patterns in the second region, sequentially setting a plurality of uniform phase shifts in a region other than the second region when setting each light phase modulation pattern in the second region to acquire the light intensity value, and acquiring a phase image of a region of the object corresponding to the second region using the phase shift method.

An embodiment of the present invention is an imaging method. The imaging method is a method for imaging an object using (1) a light source for outputting coherent light; (2) a spatial light modulator having a modulation plane to which output light from the light source is input, and for performing light phase modulation on input light in each of a plurality of pixel regions on the modulation plane based on a set light phase modulation pattern and outputting modulated light; (3) a Fourier transform optical system for forming a Fourier transform image of the object irradiated with output light from the spatial light modulator; and (4) a photodetector for selectively receiving zero-order light in the Fourier transform image to detect a light intensity and outputting a light intensity value, and includes (a) a region setting step of setting a first region and a second region on the modulation plane of the spatial light modulator; (b) a first region phase image acquisition step of sequentially setting a plurality of light phase modulation patterns in the first region, sequentially setting a plurality of uniform phase shifts in a region other than the first region when setting each light phase modulation pattern in the first region to acquire the light intensity value, and acquiring a phase image of a region of the object corresponding to the first region using a phase shift method; and (c) a second region phase image acquisition step of sequentially setting a plurality of light phase modulation patterns in the second region, sequentially setting a plurality of uniform phase shifts in a region other than the second region when setting each light phase modulation pattern in the second region to acquire the light intensity value, and acquiring a phase image of a region of the object corresponding to the second region using the phase shift method.

Advantageous Effects of Invention

According to the embodiments of the present invention, it is possible to acquire a phase image of an object with high resolution using a spatial light modulator and a photodetector.

BRIEF DESCRIPTION OF DRAWINGS

FIG. 7 includes (a) an original image used in a simulation, and (b) a phase image acquired in the simulation.

FIG. 8 includes (a) an amplitude image before correction acquired in the simulation, and (b) an amplitude image after correction acquired in the simulation.

DESCRIPTION OF EMBODIMENTS

Hereinafter, embodiments of an imaging apparatus and an imaging method will be described in detail with reference to the accompanying drawings. In the description of the drawings, the same elements will be denoted by the same reference signs, and redundant description will be omitted. The present invention is not limited to these examples.

Figure 1:
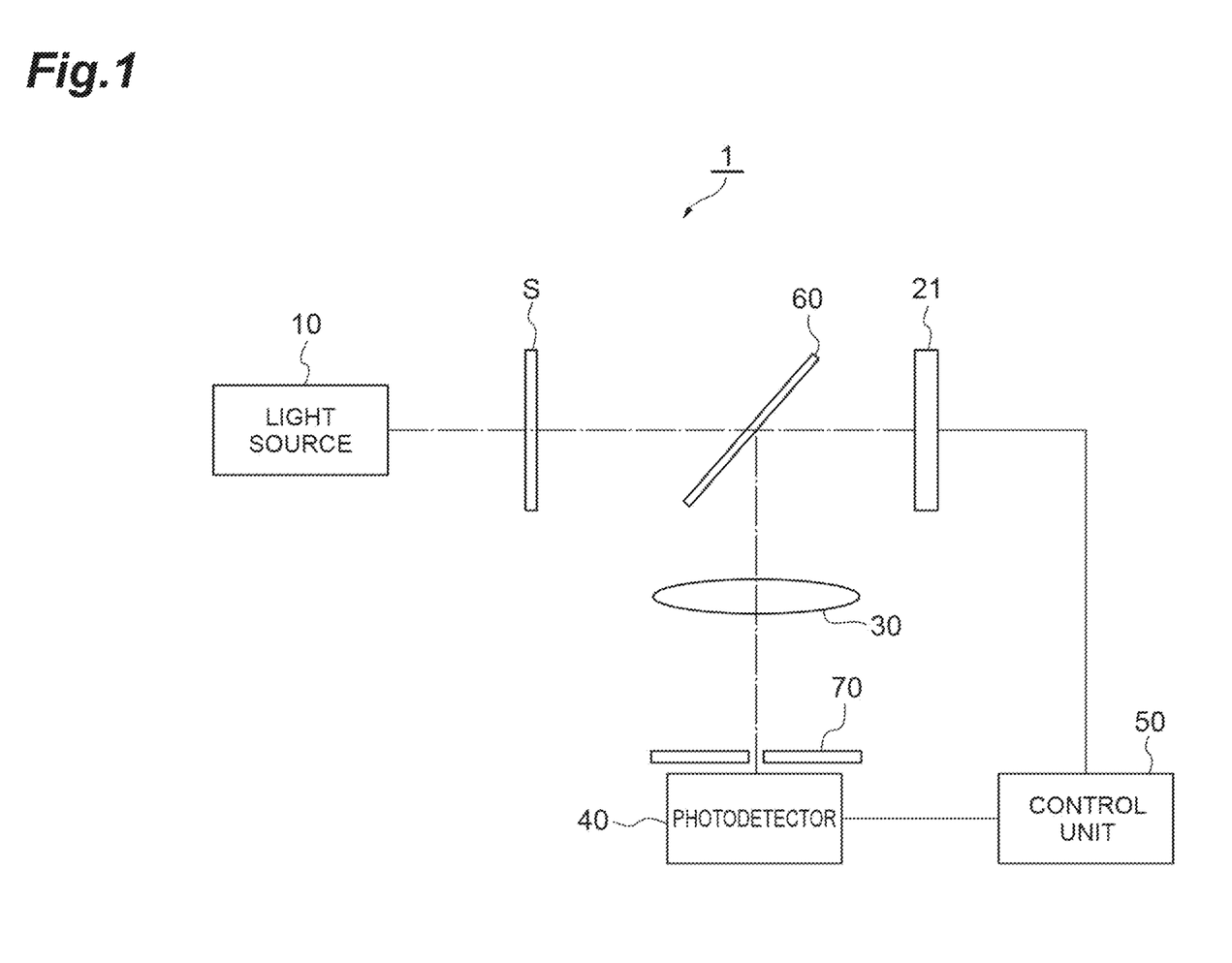
FIG. 1 is a diagram illustrating a configuration of an imaging apparatus 1.

FIG. 1 is a diagram illustrating a configuration of an imaging apparatus 1. The imaging apparatus 1 includes a light source 10, a spatial light modulator 21, a Fourier transform optical system 30, a photodetector 40, a control unit 50, a beam splitter 60, and an aperture 70. The imaging apparatus 1 can acquire a phase image of an object S, and can further acquire an amplitude image of the object S. That is, the imaging apparatus 1 can acquire a complex amplitude image.

The light source 10 is a light source for outputting coherent light with which the object S is irradiated, and is preferably a laser light source. A wavelength of the light output from the light source 10 may be any wavelength as long as light phase modulation can be performed by the spatial light modulator 21 and the photodetector 40 has sensitivity. The output light from the light source 10 is applied to the object S. A beam expander for expanding a beam diameter of the output light from the light source 10 may be provided between the light source 10 and the object S. The light transmitted through the object S is transmitted through the beam splitter 60 and reaches a modulation plane of the spatial light modulator 21.

An imaging optical system for forming an image of the object S on the modulation plane of the spatial light modulator 21 may be provided between the object S and the modulation plane of the spatial light modulator 21. When the light reaching the modulation plane of the spatial light modulator 21 from the object S propagates while maintaining the image, the imaging optical system is unnecessary.

The spatial light modulator 21 has the modulation plane on which the image of the object S irradiated with the output light from the light source 10 is formed. A plurality of pixel regions are arranged on the modulation plane, and light can be output by performing light phase modulation on input light in each pixel region. The spatial light modulator 21 performs the light phase modulation on the input light in each of the plurality of pixel regions on the modulation plane based on a set light phase modulation pattern and outputs modulated light. The spatial light modulator 21 illustrated in this figure is of a reflection type.

The output light from the spatial light modulator 21 is reflected by the beam splitter 60 and reaches the Fourier transform optical system 30. The Fourier transform optical system 30 forms a Fourier transform image of the output light from the spatial light modulator 21. The photodetector 40 selectively receives zero-order light out of the Fourier transform image, detects a light intensity thereof, and outputs a light intensity value.

The photodetector 40 does not need to be an image sensor, but may be a point sensor. A light receiving region of the photodetector 40 may have a size for selectively receiving the zero-order light in the Fourier transform image, or may have a size larger than the above. In the latter case, the aperture 70 may be provided at a position where the Fourier transform image is formed by the Fourier transform optical system 30, the zero-order light in the Fourier transform image may be selectively transmitted through the aperture 70, and the photodetector 40 may receive the light transmitted through the aperture 70.

The control unit 50 controls setting of the light phase modulation pattern on the modulation plane of the spatial light modulator 21, acquires the phase image of the object S based on the light phase modulation pattern and the light intensity value, and further acquires the amplitude image of the object S. The processing of the control unit 50 will be described in detail later.

Figure 2:
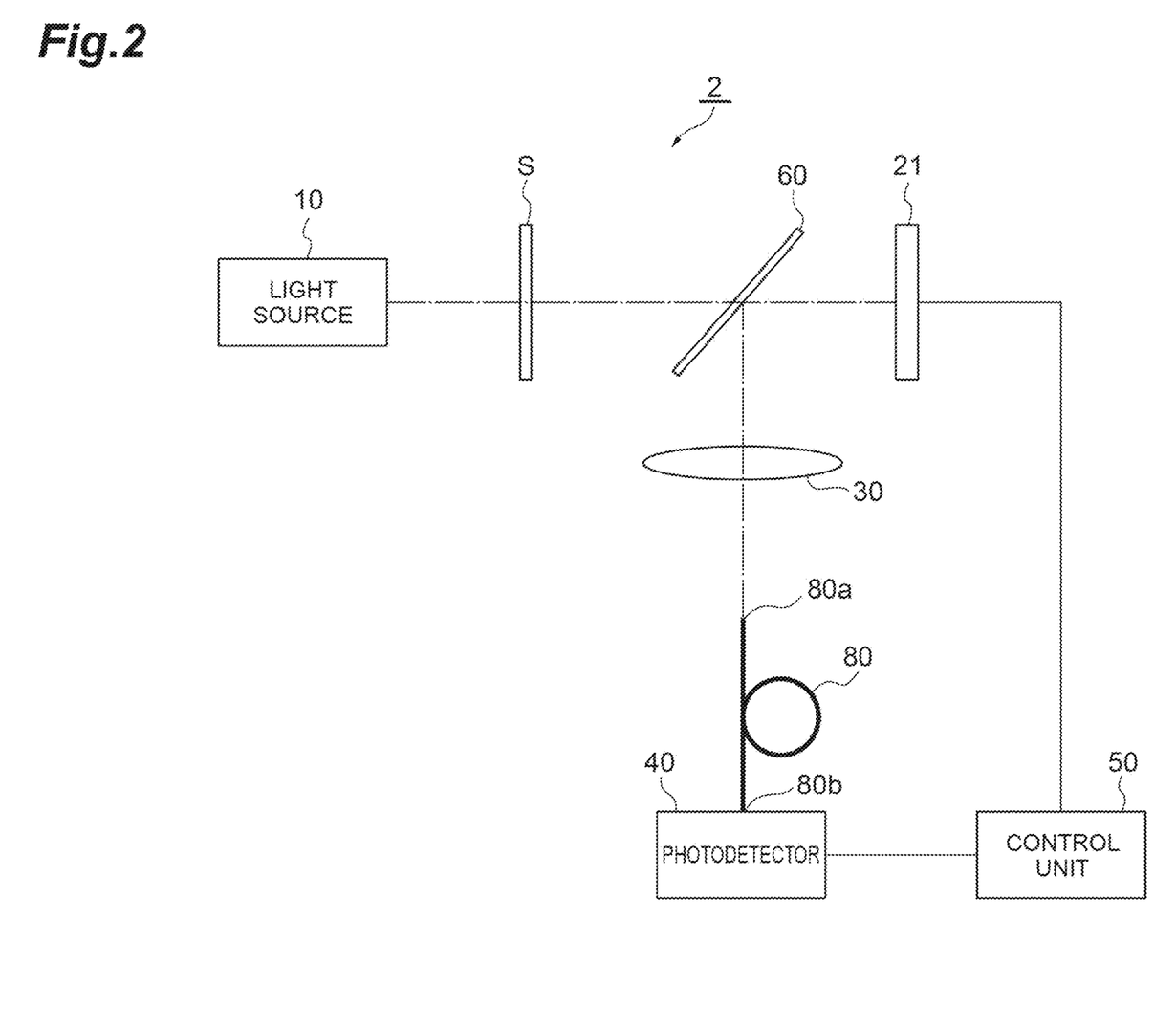
FIG. 2 is a diagram illustrating a configuration of an imaging apparatus 2.

FIG. 2 is a diagram illustrating a configuration of an imaging apparatus 2. As compared with the configuration of the imaging apparatus 1 illustrated in FIG. 1, the imaging apparatus 2 illustrated in FIG. 2 is different in that an optical fiber 80 is provided in place of the aperture 70. An input end 80a of the optical fiber 80, being an optical waveguide, is disposed at a position of the zero-order light in the Fourier transform image formed by the Fourier transform optical system 30, and the zero-order light is selectively input. The optical fiber 80 guides the light input to the input end 80a and outputs the light from an output end 80b. The photodetector 40 receives the light output from the output end 80b of the optical fiber 80. In this case also, the light receiving region of the photodetector 40 may be large.

Figure 3:
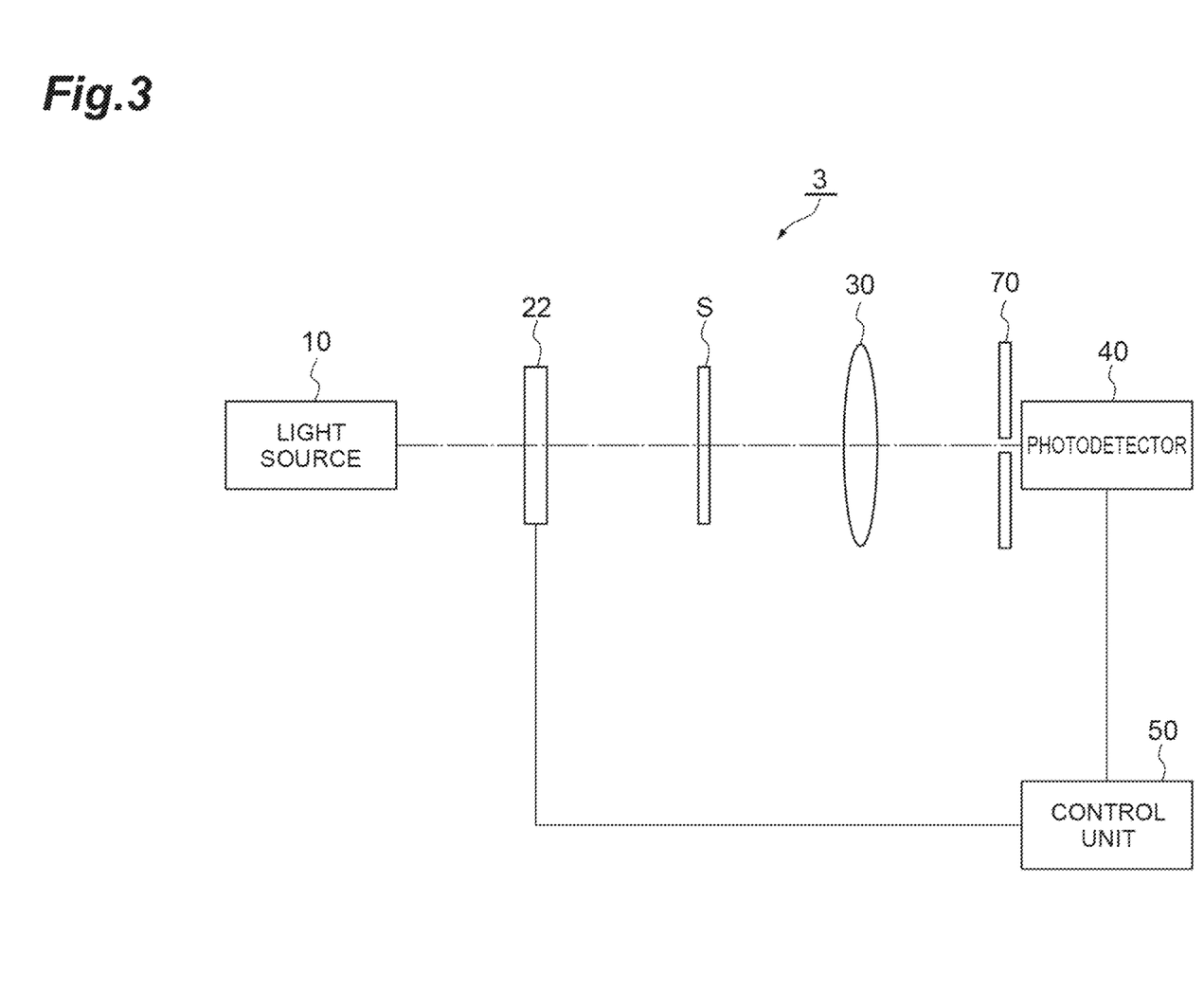
FIG. 3 is a diagram illustrating a configuration of an imaging apparatus 3.

FIG. 3 is a diagram illustrating a configuration of an imaging apparatus 3. As compared with the configuration of the imaging apparatus 1 illustrated in FIG. 1, the imaging apparatus 3 illustrated in FIG. 3 is different in that a spatial light modulator 22 of a transmission type is provided in place of the spatial light modulator 21 of the reflection type, thereby eliminating the need for the beam splitter 60. Further, as compared with the configuration of the imaging apparatus 1 illustrated in FIG. 1, the imaging apparatus 3 illustrated in FIG. 3 is different in that the object S is disposed in the subsequent stage of the spatial light modulator 22.

In the above configuration, the spatial light modulator 22 has the modulation plane to which the output light from the light source 10 is input, performs the light phase modulation on the input light in each of the plurality of pixel regions on the modulation plane based on the set light phase modulation pattern, and outputs the modulated light to the object S. The Fourier transform optical system 30 forms the Fourier transform image of the object S irradiated with the output light from the spatial light modulator 22.

In addition, the optical system of the imaging apparatus can take various configurations. For example, the optical fiber 80 may be provided in place of the aperture 70 in the configuration of FIG. 3. Instead of acquiring the phase image or the like based on the light transmitted through the object S from one side to the other side, the phase image or the like may be acquired based on the light reflected by a mirror disposed behind the object S (that is, the light that has reciprocated inside the object S).

Next, the light intensity value output from the photodetector 40 will be described. Variables representing a position on a two-dimensional orthogonal coordinate system on the modulation plane of the spatial light modulator are set ξ to and η, and variables representing a position on a two-dimensional orthogonal coordinate system on the plane on which the Fourier transform image is formed are set to x and y. The light phase modulation distribution set on the modulation plane is set to $\phi(\xi,\eta)$.

In FIG. 1, a complex amplitude distribution of the light reaching the modulation plane of the spatial light modulator is represented by the following Formula (1), and a complex amplitude distribution of the light modulated and output by the spatial light modulator is represented by the following Formula (2). A complex amplitude distribution of the Fourier transform image formed by the Fourier transform optical system 30 is represented by the following Formula (3). Here, a scale factor is ignored. j is an imaginary unit.

[Formula 1]

$$a(\xi,\eta) \cdot \exp(j\theta(\xi,\eta)) \quad (1)$$

[Formula 2]

$$a(\xi,\eta) \cdot \exp(j\theta(\xi,\eta)) \cdot \exp(j\phi(\xi,\eta)) \quad (2)$$

[Formula 3]

$$\int a(\xi,\eta) \cdot \exp(j\theta(\xi,\eta)) \cdot \exp(j\phi(\xi,\eta)) \cdot \exp(-j(x\xi+y\eta)) \cdot d\xi d\eta \quad (3)$$

A complex amplitude of the zero-order light in the Fourier transform image is acquired by setting x=y=0 in Formula (3), and is represented by the following Formula (4). The light intensity value output from the photodetector 40 is represented by the following Formula (5) as the absolute value of Formula (4). Practically, the plurality of pixel regions are discretely arranged on the modulation plane of the spatial light modulator, and thus, the following Formula (6) of the summation format is used instead of Formula (5) of the integration format. Here also, a scale factor is ignored. A subscript i represents the i-th pixel region in the plurality of pixel regions.

[Formula 4]

$$\int a(\xi,\eta) \cdot \exp(j\theta(\xi,\eta)) \cdot \exp(j\phi(\xi,\eta)) \cdot d\xi d\eta \quad (4)$$

[Formula 5]

$$\left| \int a(\xi,\eta) \cdot \exp(j\theta(\xi,\eta)) \cdot \exp(j\phi(\xi,\eta)) \cdot d\xi d\eta \right|^2 \quad (5)$$

[Formula 6]

$$\left| \sum_i a_i \cdot \exp(j\theta_i) \cdot \exp(j\phi_i) \right|^2 \quad (6)$$

Figure 4:
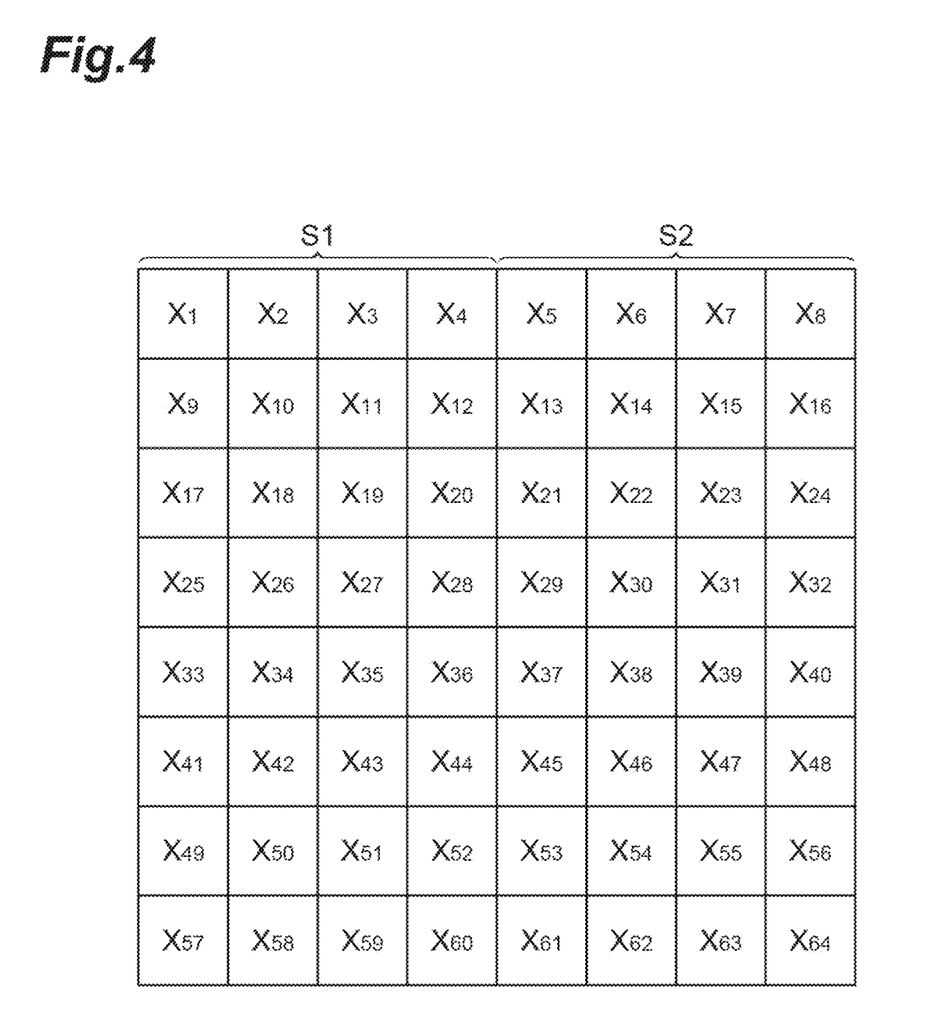
FIG. 4 is a diagram illustrating a setting example of a first region S1 and a second region S2 on a modulation plane of a spatial light modulator.
Figure 5:
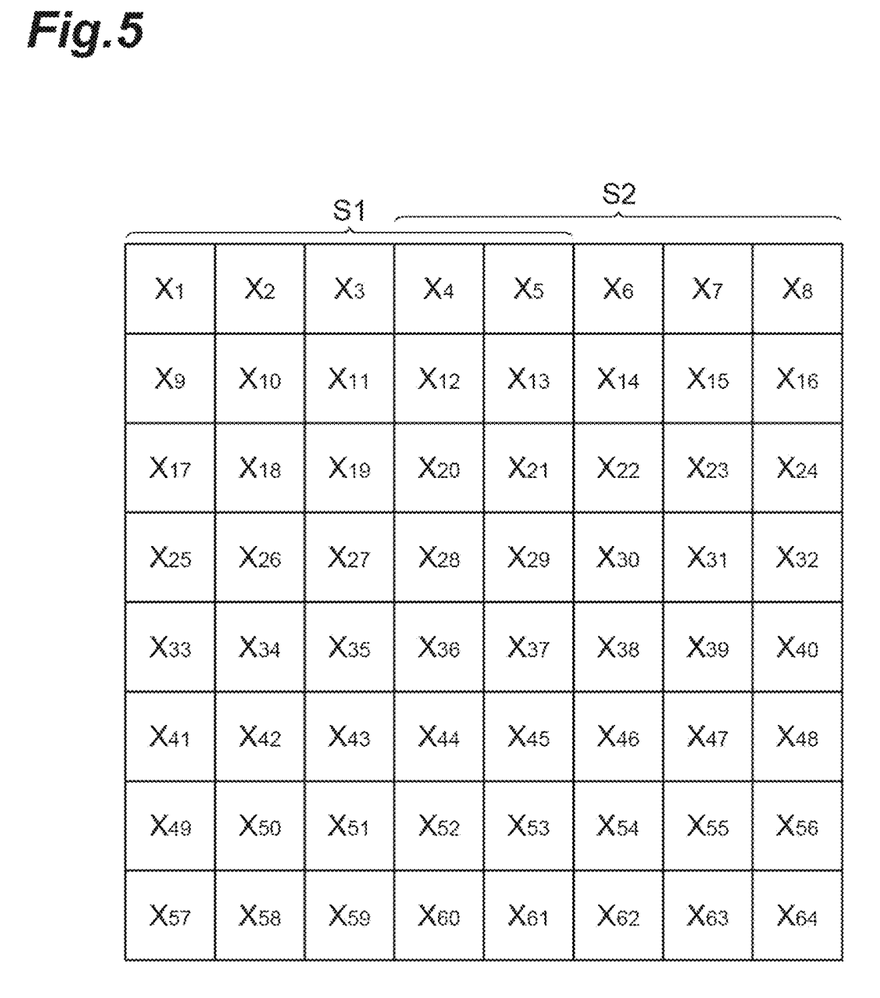
FIG. 5 is a diagram illustrating another setting example of the first region S1 and the second region S2 on the modulation plane of the spatial light modulator.

Next, the processing in the control unit 50 will be described. The control unit 50 sets a first region S1 and a second region S2 on the modulation plane of the spatial light modulator (region setting step). FIG. 4 and FIG. 5 are diagrams illustrating setting examples of the first region S1 and the second region S2 on the modulation plane of the spatial light modulator. In these figures, assuming that the modulation plane of the spatial light modulator includes 64 (=8×8) pixel regions, the complex amplitude of the light reaching the i-th pixel region in the 64 pixel regions is represented by $x_i$. The complex amplitude $x_i$ of the light reaching the i-th pixel region is represented by the following Formula (7).

[Formula 7]

$$x_i = a_i \cdot \exp(j\theta_i) \quad (7)$$

The first region S1 and the second region S2 may be set arbitrarily. For example, as illustrated in FIG. 4, a rectangular region including the 32 (=8×4) pixel regions may be set as the first region S1, and a rectangular region including the remaining 32 (=8×4) pixel regions may be set as the second region S2. Further, as illustrated in FIG. 5, a rectangular region including the 40 (=8×5) pixel regions may be set as the first region S1, and a rectangular region including the 40 (=8×5) pixel regions may be set as the second region S2, and in this case, the 16 pixel regions may be included in both the first region S1 and the second region S2.

Further, each of the first region S1 and the second region S2 may not be a rectangular region, and further, may include a plurality of partial regions instead of a single region. Hereinafter, as illustrated in FIG. 4, a case where each pixel region is included in one of the first region S1 and the second region S2 will be described.

The control unit 50 acquires the phase image of a region of the object S corresponding to the first region S1 (first region phase image acquisition step), and acquires the phase image of a region of the object S corresponding to the second region S2 (second region phase image acquisition step). Further, the control unit 50 acquires the amplitude image of the object S corresponding to both the first region and the second region (amplitude image acquisition step).

Figure 6:
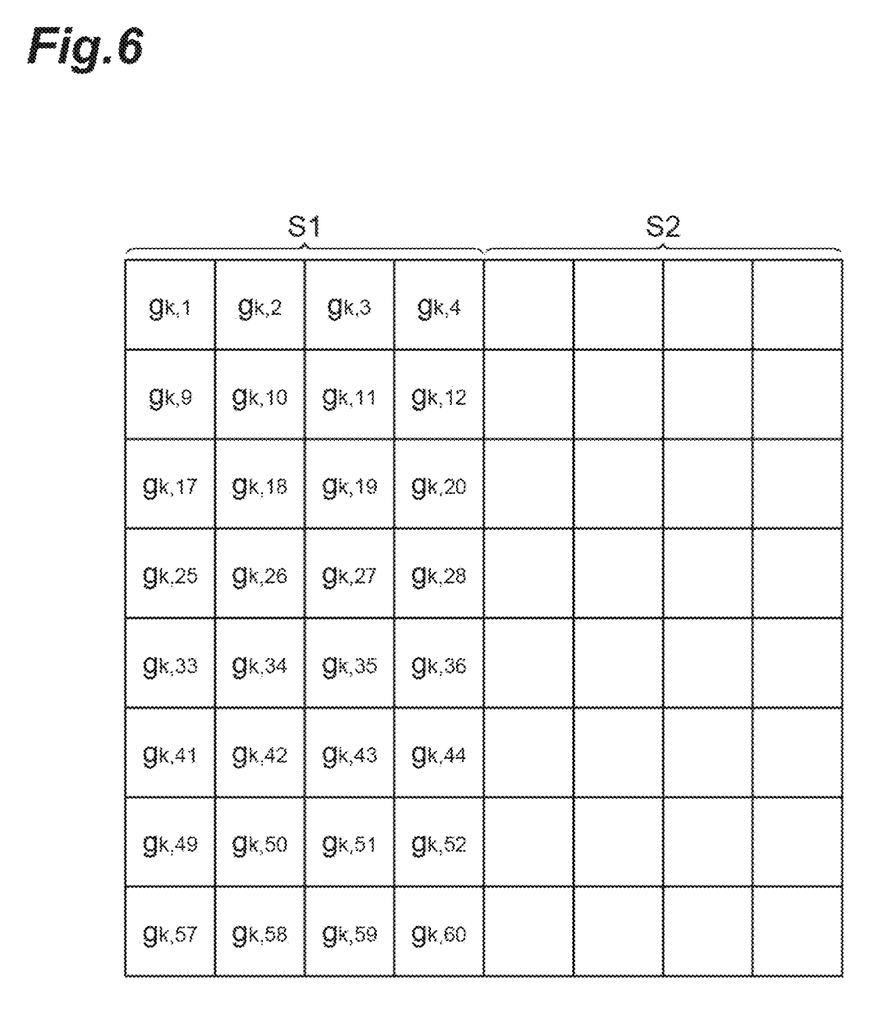
FIG. 6 is a diagram illustrating a k-th light phase modulation pattern $g_{k,i}$ in the first region S1 on the modulation plane of the spatial light modulator.

The processing in the first region phase image acquisition step is as follows. A plurality of light phase modulation patterns are sequentially set in the first region S1. The number of light phase modulation patterns to be set is preferably 32, which is the same number as the number of pixel regions included in the first region S1. The k-th light phase modulation pattern $g_{k,i}$ in the plurality of light phase modulation patterns set in the first region S1 is represented by the following Formula (8). FIG. 6 is a diagram illustrating the k-th light phase modulation pattern $g_{k,i}$ in the first region S1 on the modulation plane of the spatial light modulator. The complex amplitude of the modulated light output from the i-th pixel region in the first region S1 is represented by the following Formula (9). The sum of the complex amplitudes of the modulated light output from all the pixel regions in the first region S1 is represented by the following Formula (10).

[Formula 8]

$$g_{k,i} = \exp(j\phi_{k,i}) \quad (8)$$

[Formula 9]

$$x_i \cdot g_{k,i} = a_i \cdot \exp(j\theta_i) \cdot \exp(j\phi_{k,i}) \quad (9)$$

[Formula 10]

$$\sum_{i \in S1} a_i \cdot \exp(j\theta_i) \cdot \exp(j\phi_{k,i}) \equiv A_k \cdot \exp(j\Theta_k) \quad (10)$$

When each light phase modulation pattern $g_{k,i}$ is set in the first region S1, a plurality of uniform phase shifts are sequentially set in a region other than the first region S1 (that is, the second region S2). When the uniform phase shift φ is set, the complex amplitude of the modulated light output from the i-th pixel region in the second region S2 is represented by the following Formula (11). The sum of the complex amplitudes of the modulated light output from all the pixel regions in the second region S2 is represented by the following Formula (12). b in the right side of Formula (12) is represented by the following Formula (13), is a value when the phase modulation serving as a reference of the phase shift is applied, and can be a real number.

[Formula 11]

$$a_i \cdot \exp(j\theta_i) \cdot \exp(j\phi) \quad (11)$$

-continued

[Formula 12]
$$\sum_{i \in S2} a_i \cdot \exp(j\theta_i) \cdot \exp(j\phi) = b \cdot \exp(j\phi) \quad (12)$$

[Formula 13]
$$\sum_{i \in S2} a_i \cdot \exp(j\theta_i) \equiv b \quad (13)$$

The light intensity value $I_\phi$ output from the photodetector 40 is represented by the following Formula (14), as the square of the absolute value of the sum of Formula (10) and Formula (12).

[Formula 14]
$$I_\phi = |A_k \cdot \exp(j\Theta_k) + b \cdot \exp(j\phi)|^2 \quad (14)$$

The phase image of the region of the object corresponding to the first region S1 can be acquired using the phase shift method based on the light intensity value acquired by sequentially setting the plurality of (preferably three or more) uniform phase shifts $\phi$ in the second region S2 when each light phase modulation pattern $g_{k,i}$ is set in the first region S1.

For example, in a case of using the four point phase shift method, when each light phase modulation pattern $g_{k,i}$ is set in the first region S1, 0, $\pi/2$, $\pi$, and $3\pi/2$ are sequentially set as the uniform phase shifts $\phi$ in the second region S2 to acquire the light intensity values $I_0$, $I_{\pi/2}$, $I_\pi$, and $I_{3\pi/2}$. In this case, $\Theta_k$ in the right side of Formula (10) is acquired by the following Formula (15), and the product $A_k b$ of $A_k$ in the right side of Formula (10) and b in the right side of Formula (12) is acquired by the following Formula (16).

[Formula 15]
$$\Theta_k = \tan^{-1}\left(\frac{I_{\pi/2} - I_{3\pi/2}}{I_0 - I_\pi}\right) \quad (15)$$

[Formula 16]
$$A_k \cdot b = \frac{\sqrt{(I_0 - I_\pi)^2 + (I_{\pi/2} - I_{3\pi/2})^2}}{2} \quad (16)$$

The simultaneous equations represented by the following Formula (17) are acquired by sequentially setting the plurality of light phase modulation patterns $g_{k,i}$ in the first region S1, and sequentially setting the plurality of uniform phase shifts in the second region S2 when each light phase modulation pattern is set in the first region S1. When the number of light phase modulation patterns to be set is equal to the number of pixel regions included in the first region S1, since Formula (17) is linear simultaneous equations, the solution $\{X_i\}$ is acquired using the inverse matrix of the matrix $\{g_{k,i}\}$.

[Formula 17]
$$\sum_{i \in S1} g_{k,i} \cdot X_i = A_k \cdot b \cdot \exp(j\Theta_k) \quad (17)$$

In addition, what is originally desired to be solved is the following Formula (18), and there is a relationship of the following Formula (19) between $\{X_i\}$ and $\{x_i\}$. That is, in the first region phase image acquisition step, the phase image $\{\theta_i\}$ of the region of the object S corresponding to the first region S1 can be acquired, and further, the image $\{a_i b\}$ obtained by multiplying the amplitude image $\{a_i\}$ of the region of the object S corresponding to the first region S1 by b can be acquired.

[Formula 18]
$$\sum_{i \in S1} g_{k,i} \cdot x_i = A_k \cdot \exp(j\Theta_k) \quad (18)$$

[Formula 19]
$$X_i = b \cdot x_i \quad (19)$$

The processing in the second region phase image acquisition step following the first region phase image acquisition step is as follows. A plurality of light phase modulation patterns are sequentially set in the second region S2. The number of light phase modulation patterns to be set is preferably 32, which is the same number as the number of pixel regions included in the second region S2. The sum of the complex amplitudes of the modulated light output from all the pixel regions in the second region S2 is represented by the following Formula (20).

[Formula 20]
$$\sum_{i \in S2} a_i \cdot \exp(j\theta_i) \cdot \exp(j\phi_{k,i}) \equiv A_k \cdot \exp(j\Theta_k) \quad (20)$$

When each light phase modulation pattern is set in the second region S2, a plurality of uniform phase shifts are sequentially set in a region other than the second region S2 (that is, the first region S1). The sum of the complex amplitudes of the modulated light output from all the pixel regions in the first region S1 when the uniform phase shift $\phi$ is set is represented by the following Formula (21). $\Phi$ in the right side of Formula (21) is represented by the following Formula (22), and is acquired based on the processing result in the first region phase image acquisition step.

[Formula 21]
$$\sum_{i \in S1} a_i \cdot \exp(j\theta_i) \cdot \exp(j\phi) \equiv c \cdot \exp(i\Phi) \cdot \exp(j\phi) \quad (21)$$

[Formula 22]
$$\Phi = \arg\left(\sum_{i \in S1} X_i\right) \quad (22)$$

The light intensity value $I_\phi$ output from the photodetector 40 is represented by the following Formula (23), as the square of the absolute value of the sum of Formula (20) and Formula (21).

[Formula 23]
$$I_\phi = |A_k \cdot \exp(j\Theta_k) + c \cdot \exp(j\Phi) \cdot \exp(j\phi)|^2 = |A_k \cdot \exp(j(\Theta_k - \Phi)) + c \cdot \exp(j\phi)|^2 \quad (23)$$

The phase image $\{\theta_i\}$ of the region of the object S corresponding to the second region S2 can be acquired using the phase shift method as in the first region phase image acquisition step based on the light intensity value acquired by sequentially setting the plurality of (preferably three or more) uniform phase shifts ϕ in the first region S1 when each light phase modulation pattern $g_{k,i}$ is set in the second region S2, and further, the image $\{a_i c\}$ obtained by multiplying the amplitude image $\{a_i\}$ of the region of the object S corresponding to the second region S2 by c can be acquired.

By the processing up to the above point, the phase image $\{\theta_i\}$ of the object S corresponding to both the first region and the second region can be acquired. In addition, as to the amplitude image, the image $\{a_i b\}$ obtained by multiplying the amplitude image $\{a_i\}$ of the region of the object S corresponding to the first region S1 by b and the image $\{a_i c\}$ obtained by multiplying the amplitude image $\{a_i\}$ of the region of the object S corresponding to the second region S2 by c are acquired, and the amplitude is different by a constant factor between the first region S1 and the second region S2. Therefore, in order to smoothly connect the amplitude image between the first region S1 and the second region S2, both or any one of the amplitude images may be multiplied by a constant factor and corrected. In this way, the amplitude image $\{a_i\}$ of the object S corresponding to both the first region and the second region can be acquired.

In addition, as illustrated in FIG. 5, when a part of the pixel regions is included in both the first region S1 and the second region S2, both or any one of the amplitude images may be multiplied by a constant factor and corrected such that the amplitudes of the pixel region included in both the first region S1 and the second region S2 coincide with each other (or such that the difference in amplitude becomes small).

Figure 7:
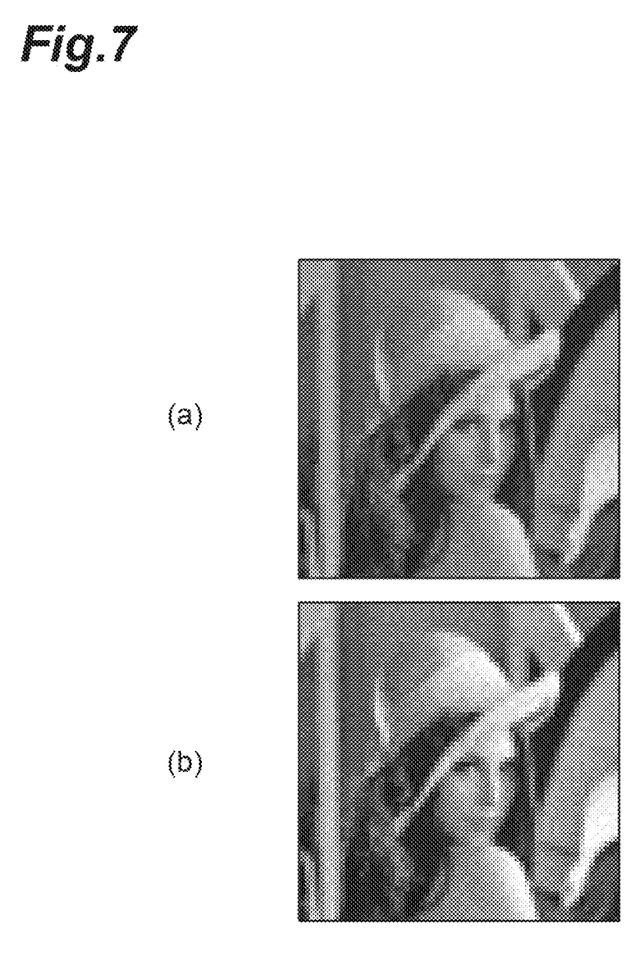
Figure 8:
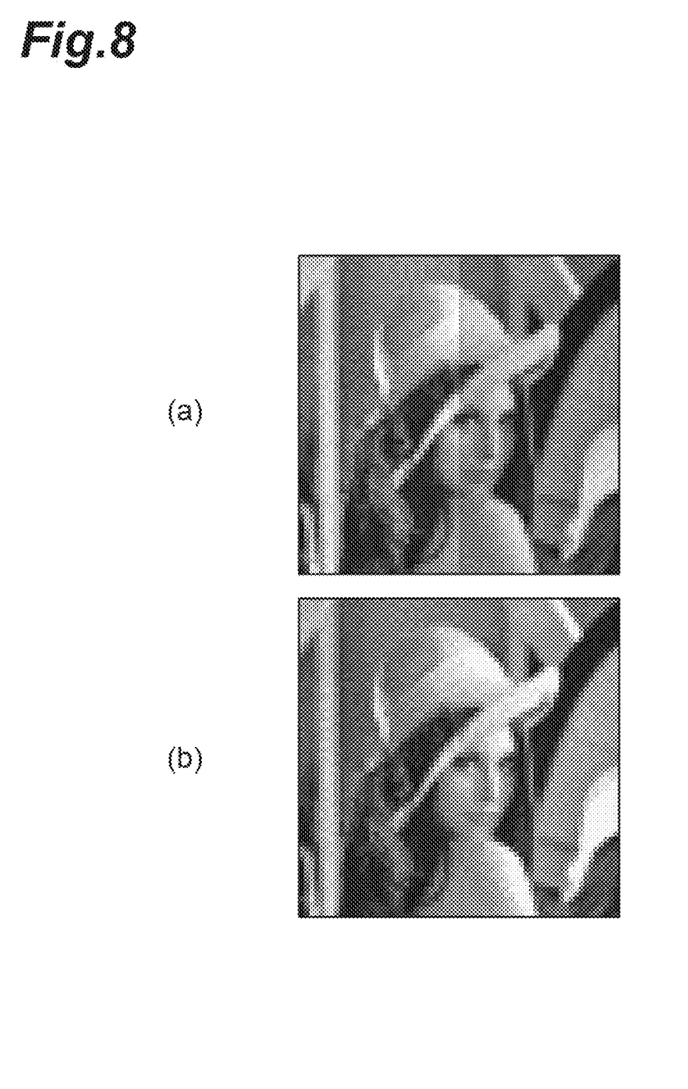

Next, simulation results will be described. In this case, as illustrated in FIG. 4, it is assumed that each pixel region is included in any one of the first region S1 and the second region S2 on the modulation plane of the spatial light modulator. (a) in FIG. 7 shows an original image used in the simulation. (b) in FIG. 7 shows the phase image acquired in the simulation. (a) in FIG. 8 shows the amplitude image before correction acquired in the simulation. (b) in FIG. 8 shows the amplitude image after correction acquired in the simulation.

As described above, according to the present embodiment, the phase image of the object can be acquired using all the pixel regions on the modulation plane of the spatial light modulator, and thus, the phase image of the object with high resolution can be acquired, and further, the amplitude image with high resolution can be acquired.

The imaging apparatus and the imaging method of the present invention are not limited to the embodiments and configuration examples described above, and various modifications are possible.

The imaging apparatus of the above embodiment includes (1) a light source for outputting coherent light; (2) a spatial light modulator having a modulation plane on which an image of an object irradiated with output light from the light source is formed, and for performing light phase modulation on input light in each of a plurality of pixel regions on the modulation plane based on a set light phase modulation pattern and outputting modulated light; (3) a Fourier transform optical system for forming a Fourier transform image of output light from the spatial light modulator; (4) a photodetector for selectively receiving zero-order light in the Fourier transform image to detect a light intensity and outputting a light intensity value; and (5) a control unit for controlling setting of the light phase modulation pattern on the modulation plane of the spatial light modulator and acquiring a phase image of the object based on the light phase modulation pattern and the light intensity value.

The imaging apparatus of the above embodiment includes (1) a light source for outputting coherent light; (2) a spatial light modulator having a modulation plane to which output light from the light source is input, and for performing light phase modulation on input light in each of a plurality of pixel regions on the modulation plane based on a set light phase modulation pattern and outputting modulated light; (3) a Fourier transform optical system for forming a Fourier transform image of an object irradiated with output light from the spatial light modulator; (4) a photodetector for selectively receiving zero-order light in the Fourier transform image to detect a light intensity and outputting a light intensity value; and (5) a control unit for controlling setting of the light phase modulation pattern on the modulation plane of the spatial light modulator and acquiring a phase image of the object based on the light phase modulation pattern and the light intensity value.

In the above imaging apparatus, the control unit is configured to (a) set a first region and a second region on the modulation plane of the spatial light modulator, (b) in a phase image acquisition of the first region (first region phase image acquisition step), sequentially set a plurality of light phase modulation patterns in the first region, sequentially set a plurality of uniform phase shifts in a region other than the first region when setting each light phase modulation pattern in the first region to acquire the light intensity value, and acquire a phase image of a region of the object corresponding to the first region using a phase shift method, and (c) in a phase image acquisition of the second region (second region phase image acquisition step), sequentially set a plurality of light phase modulation patterns in the second region, sequentially set a plurality of uniform phase shifts in a region other than the second region when setting each light phase modulation pattern in the second region to acquire the light intensity value, and acquire a phase image of a region of the object corresponding to the second region using the phase shift method.

In the above imaging apparatus, in the phase image acquisition of the first region (first region phase image acquisition step), the control unit may sequentially set the same number of light phase modulation patterns in the first region as the number of pixel regions included in the first region. Further, in the above imaging apparatus, in the phase image acquisition of the second region (second region phase image acquisition step), the control unit may sequentially set the same number of light phase modulation patterns in the second region as the number of pixel regions included in the second region.

In the above imaging apparatus, using the phase shift method, the control unit may acquire an amplitude image of the region of the object corresponding to the first region, acquire an amplitude image of the region of the object corresponding to the second region, and acquire an amplitude image of the object corresponding to both the first region and the second region by adjusting an amplitude ratio between the two amplitude images.

The above imaging apparatus may further include an aperture for selectively transmitting the zero-order light in the Fourier transform image formed by the Fourier transform optical system, and the photodetector may receive the light transmitted through the aperture.

The above imaging apparatus may further include an optical waveguide having an input end disposed at a position of the zero-order light in the Fourier transform image formed by the Fourier transform optical system, and for guiding light input to the input end and outputting the light from an output end, and the photodetector may receive the light output from the output end of the optical waveguide.

The imaging method of the above embodiment is a method for imaging an object using (1) a light source for outputting coherent light; (2) a spatial light modulator having a modulation plane on which an image of the object irradiated with output light from the light source is formed, and for performing light phase modulation on input light in each of a plurality of pixel regions on the modulation plane based on a set light phase modulation pattern and outputting modulated light; (3) a Fourier transform optical system for forming a Fourier transform image of output light from the spatial light modulator; and (4) a photodetector for selectively receiving zero-order light in the Fourier transform image to detect a light intensity and outputting a light intensity value.

The imaging method of the above embodiment is a method for imaging an object using (1) a light source for outputting coherent light; (2) a spatial light modulator having a modulation plane to which output light from the light source is input, and for performing light phase modulation on input light in each of a plurality of pixel regions on the modulation plane based on a set light phase modulation pattern and outputting modulated light; (3) a Fourier transform optical system for forming a Fourier transform image of the object irradiated with output light from the spatial light modulator; and (4) a photodetector for selectively receiving zero-order light in the Fourier transform image to detect a light intensity and outputting a light intensity value.

The above imaging method includes (a) a region setting step of setting a first region and a second region on the modulation plane of the spatial light modulator; (b) a first region phase image acquisition step of sequentially setting a plurality of light phase modulation patterns in the first region, sequentially setting a plurality of uniform phase shifts in a region other than the first region when setting each light phase modulation pattern in the first region to acquire the light intensity value, and acquiring a phase image of a region of the object corresponding to the first region using a phase shift method; and (c) a second region phase image acquisition step of sequentially setting a plurality of light phase modulation patterns in the second region, sequentially setting a plurality of uniform phase shifts in a region other than the second region when setting each light phase modulation pattern in the second region to acquire the light intensity value, and acquiring a phase image of a region of the object corresponding to the second region using the phase shift method.

In the above imaging method, in the first region phase image acquisition step, the same number of light phase modulation patterns as the number of pixel regions included in the first region may be sequentially set in the first region. Further, in the above imaging method, in the second region phase image acquisition step, the same number of light phase modulation patterns as the number of pixel regions included in the second region may be sequentially set in the second region.

The above imaging method may further include an amplitude image acquisition step of, using the phase shift method, acquiring an amplitude image of the region of the object corresponding to the first region, acquiring an amplitude image of the region of the object corresponding to the second region, and acquiring an amplitude image of the object corresponding to both the first region and the second region by adjusting an amplitude ratio between the two amplitude images.

In the above imaging method, using an aperture for selectively transmitting the zero-order light in the Fourier transform image formed by the Fourier transform optical system, the light transmitted through the aperture may be received by the photodetector.

In the above imaging method, using an optical waveguide having an input end disposed at a position of the zero-order light in the Fourier transform image formed by the Fourier transform optical system, and for guiding light input to the input end and outputting the light from an output end, the light output from the output end of the optical waveguide may be received by the photodetector.

INDUSTRIAL APPLICABILITY

The present invention can be used as an imaging apparatus and an imaging method capable of acquiring a phase image of an object with high resolution using a spatial light modulator and a photodetector.

REFERENCE SIGNS LIST 1-3—imaging apparatus, 10—light source, 21, 22—spatial light modulator, 30—Fourier transform optical system, 40—photodetector, 50—control unit, 60—beam splitter, 70—aperture, 80—optical fiber, S—object.

The invention claimed is:

1. An imaging apparatus comprising:
a light source configured to output coherent light;
a spatial light modulator having a modulation plane on which an image of an object irradiated with output light from the light source is formed, and configured to perform light phase modulation on input light in each of a plurality of pixel regions on the modulation plane based on a set light phase modulation pattern and output modulated light;
a Fourier transform optical system configured to form a Fourier transform image of output light from the spatial light modulator;
a photodetector configured to selectively receive zero-order light in the Fourier transform image to detect a light intensity and output a light intensity value; and
a control unit configured to control setting of the light phase modulation pattern on the modulation plane of the spatial light modulator and acquire a phase image of the object based on the light phase modulation pattern and the light intensity value, wherein
the control unit is configured to:
set a first region and a second region on the modulation plane of the spatial light modulator,
in a phase image acquisition of the first region, sequentially set a plurality of light phase modulation patterns in the first region, sequentially set a plurality of uniform phase shifts in a region other than the first region when setting each light phase modulation pattern in the first region to acquire the light intensity value, and acquire a phase image of a region of the object corresponding to the first region using a phase shift method, and
in a phase image acquisition of the second region, sequentially set a plurality of light phase modulation patterns in the second region, sequentially set a plurality of uniform phase shifts in a region other than the second region when setting each light phase modulation pattern in the second region to acquire the light intensity value, and acquire a phase image of a region of the object corresponding to the second region using the phase shift method.

2. The imaging apparatus according to claim 1, wherein, in the phase image acquisition of the first region, the control unit is configured to sequentially set the same number of light phase modulation patterns in the first region as the number of pixel regions included in the first region.

3. The imaging apparatus according to claim 1, wherein, in the phase image acquisition of the second region, the control unit is configured to sequentially set the same number of light phase modulation patterns in the second region as the number of pixel regions included in the second region.

4. The imaging apparatus according to claim 1, wherein, using the phase shift method, the control unit is configured to acquire an amplitude image of the region of the object corresponding to the first region, acquire an amplitude image of the region of the object corresponding to the second region, and acquire an amplitude image of the object corresponding to both the first region and the second region by adjusting an amplitude ratio between the two amplitude images.

5. The imaging apparatus according to claim 1, further comprising an aperture configured to selectively transmit the zero-order light in the Fourier transform image formed by the Fourier transform optical system, wherein
the photodetector receives is configured to receive the light transmitted through the aperture.

6. The imaging apparatus according to claim 1, further comprising an optical waveguide having an input end disposed at a position of the zero-order light in the Fourier transform image formed by the Fourier transform optical system, and configured to guide light input to the input end and output the light from an output end, wherein
the photodetector is configured to receive the light output from the output end of the optical waveguide.

7. An imaging apparatus comprising:
a light source configured to output coherent light;
a spatial light modulator having a modulation plane to which output light from the light source is input, and configured to perform light phase modulation on input light in each of a plurality of pixel regions on the modulation plane based on a set light phase modulation pattern and output modulated light;
a Fourier transform optical system configured to form a Fourier transform image of an object irradiated with output light from the spatial light modulator;
a photodetector configured to selectively receive zero-order light in the Fourier transform image to detect a light intensity and output a light intensity value; and
a control unit for configured to control setting of the light phase modulation pattern on the modulation plane of the spatial light modulator and acquire a phase image of the object based on the light phase modulation pattern and the light intensity value,
wherein
the control unit is configured to:
set a first region and a second region on the modulation plane of the spatial light modulator,
in a phase image acquisition of the first region, sequentially set a plurality of light phase modulation patterns in the first region, sequentially set a plurality of uniform phase shifts in a region other than the first region when setting each light phase modulation pattern in the first region to acquire the light intensity value, and acquire a phase image of a region of the object corresponding to the first region using a phase shift method, and
in a phase image acquisition of the second region, sequentially set a plurality of light phase modulation patterns in the second region, sequentially set a plurality of uniform phase shifts in a region other than the second region when setting each light phase modulation pattern in the second region to acquire the light intensity value, and acquire a phase image of a region of the object corresponding to the second region using the phase shift method.

8. The imaging apparatus according to claim 7, wherein, in the phase image acquisition of the first region, the control unit is configured to sequentially set the same number of light phase modulation patterns in the first region as the number of pixel regions included in the first region.

9. The imaging apparatus according to claim 7, wherein, in the phase image acquisition of the second region, the control unit is configured to sequentially set the same number of light phase modulation patterns in the second region as the number of pixel regions included in the second region.

10. The imaging apparatus according to claim 7, wherein, using the phase shift method, the control unit is configured to acquire an amplitude image of the region of the object corresponding to the first region, acquire an amplitude image of the region of the object corresponding to the second region, and acquire an amplitude image of the object corresponding to both the first region and the second region by adjusting an amplitude ratio between the two amplitude images.

11. The imaging apparatus according to claim 7, further comprising an aperture configured to selectively transmit the zero-order light in the Fourier transform image formed by the Fourier transform optical system, wherein
the photodetector is configured to receive the light transmitted through the aperture.

12. The imaging apparatus according to claim 7, further comprising an optical waveguide having an input end disposed at a position of the zero-order light in the Fourier transform image formed by the Fourier transform optical system, and configured to guide light input to the input end and output the light from an output end, wherein
the photodetector is configured to receive the light output from the output end of the optical waveguide.

13. An imaging method for imaging an object using:
a light source configured to output coherent light;
a spatial light modulator having a modulation plane on which an image of the object irradiated with output light from the light source is formed, and configured to perform light phase modulation on input light in each of a plurality of pixel regions on the modulation plane based on a set light phase modulation pattern and output modulated light;
a Fourier transform optical system configured to form a Fourier transform image of output light from the spatial light modulator; and
a photodetector configured to selectively receiving receive zero-order light in the Fourier transform image to detect a light intensity and output a light intensity value,
the method comprising:
a region setting step of setting a first region and a second region on the modulation plane of the spatial light modulator;
a first region phase image acquisition step of sequentially setting a plurality of light phase modulation patterns in the first region, sequentially setting a plurality of uniform phase shifts in a region other than the first region when setting each light phase modulation pattern in the first region to acquire the light intensity value, and acquiring a phase image of a region of the object corresponding to the first region using a phase shift method; and a second region phase image acquisition step of sequentially setting a plurality of light phase modulation patterns in the second region, sequentially setting a plurality of uniform phase shifts in a region other than the second region when setting each light phase modulation pattern in the second region to acquire the light intensity value, and acquiring a phase image of a region of the object corresponding to the second region using the phase shift method.

14. The imaging method according to claim 13, wherein, in the first region phase image acquisition step, the same number of light phase modulation patterns as the number of pixel regions included in the first region are sequentially set in the first region.

15. The imaging method according to claim 13, wherein, in the second region phase image acquisition step, the same number of light phase modulation patterns as the number of pixel regions included in the second region are sequentially set in the second region.

16. The imaging method according to claim 13, further comprising an amplitude image acquisition step of, using the phase shift method, acquiring an amplitude image of the region of the object corresponding to the first region, acquiring an amplitude image of the region of the object corresponding to the second region, and acquiring an amplitude image of the object corresponding to both the first region and the second region by adjusting an amplitude ratio between the two amplitude images.

17. The imaging method according to claim 13, wherein, using an aperture configured to selectively transmit the zero-order light in the Fourier transform image formed by the Fourier transform optical system,
the light transmitted through the aperture is received by the photodetector.

18. The imaging method according to claim 13, wherein, using an optical waveguide having an input end disposed at a position of the zero-order light in the Fourier transform image formed by the Fourier transform optical system, and configured to guide light input to the input end and output the light from an output end,
the light output from the output end of the optical waveguide is received by the photodetector.

19. An imaging method for imaging an object using:
a light source configured to output coherent light;
a spatial light modulator having a modulation plane to which output light from the light source is input, and configured to perform light phase modulation on input light in each of a plurality of pixel regions on the modulation plane based on a set light phase modulation pattern and output modulated light;
a Fourier transform optical system configured to form a Fourier transform image of the object irradiated with output light from the spatial light modulator; and
a photodetector configured to selectively receive zero-order light in the Fourier transform image to detect a light intensity and output a light intensity value, the method comprising:
a region setting step of setting a first region and a second region on the modulation plane of the spatial light modulator;
a first region phase image acquisition step of sequentially setting a plurality of light phase modulation patterns in the first region, sequentially setting a plurality of uniform phase shifts in a region other than the first region when setting each light phase modulation pattern in the first region to acquire the light intensity value, and acquiring a phase image of a region of the object corresponding to the first region using a phase shift method; and
a second region phase image acquisition step of sequentially setting a plurality of light phase modulation patterns in the second region, sequentially setting a plurality of uniform phase shifts in a region other than the second region when setting each light phase modulation pattern in the second region to acquire the light intensity value, and acquiring a phase image of a region of the object corresponding to the second region using the phase shift method.

20. The imaging method according to claim 19, wherein, in the first region phase image acquisition step, the same number of light phase modulation patterns as the number of pixel regions included in the first region are sequentially set in the first region.

21. The imaging method according to claim 19, wherein, in the second region phase image acquisition step, the same number of light phase modulation patterns as the number of pixel regions included in the second region are sequentially set in the second region.

22. The imaging method according to claim 19, further comprising an amplitude image acquisition step of, using the phase shift method, acquiring an amplitude image of the region of the object corresponding to the first region, acquiring an amplitude image of the region of the object corresponding to the second region, and acquiring an amplitude image of the object corresponding to both the first region and the second region by adjusting an amplitude ratio between the two amplitude images.

23. The imaging method according to claim 19, wherein, using an aperture configured to selectively transmit the zero-order light in the Fourier transform image formed by the Fourier transform optical system,
the light transmitted through the aperture is received by the photodetector.

24. The imaging method according to claim 19, wherein, using an optical waveguide having an input end disposed at a position of the zero-order light in the Fourier transform image formed by the Fourier transform optical system, and configured to guide light input to the input end and output the light from an output end,
the light output from the output end of the optical waveguide is received by the photodetector.

* * * * *